United States Patent [19]

Fly

[11] 4,360,500
[45] Nov. 23, 1982

[54] MINERAL LEACHING

[76] Inventor: Anderson B. Fly, 1406 N. Roosevelt, Amarillo, Tex. 79107

[21] Appl. No.: 832,088

[22] Filed: Sep. 12, 1977

[51] Int. Cl.$^3$ .................... B01D 11/00; B01F 1/00
[52] U.S. Cl. .......................................... 423/1; 423/3; 423/20; 423/27; 423/98; 423/109; 423/658.5; 75/101 R; 209/158; 266/168
[58] Field of Search .............. 423/1, 658.5, 3, 20, 423/27, 109; 23/267 R, 267 E; 75/101 R; 209/158

[56] References Cited

U.S. PATENT DOCUMENTS

| | | | |
|---|---|---|---|
| 2,420,180 | 5/1947 | Laughlin | 209/158 |
| 3,224,581 | 12/1965 | McKnight et al. | 209/158 |
| 3,777,003 | 12/1973 | Mitterer | 75/101 R |
| 3,777,004 | 12/1973 | Lankenau et al. | 75/101 R |
| 3,885,017 | 5/1975 | Robinson et al. | 75/101 R |
| 4,071,611 | 1/1978 | Chilson | 423/658.5 |

Primary Examiner—Herbert T. Carter
Attorney, Agent, or Firm—Wendell Coffee

[57] ABSTRACT

Uranium ore is crushed and formed into a slurry. The slurry is pumped into a leaching tank and classified by a sparge tube projecting water at teeter velocity at the bottom of the ore bed. Thereafter, a second ore bed is pumped by the slurry into the tank and the second bed classified. This is repeated until there are four or five ore beds in the tank.

Thereafter, the ore is leached by passing liquid up from the bottom of the tank at velocities less than teeter velocities so that the bed remains classified.

After leaching, the ore is formed into a slurry and the slurry pumped from the tanks to disposal.

25 Claims, 7 Drawing Figures

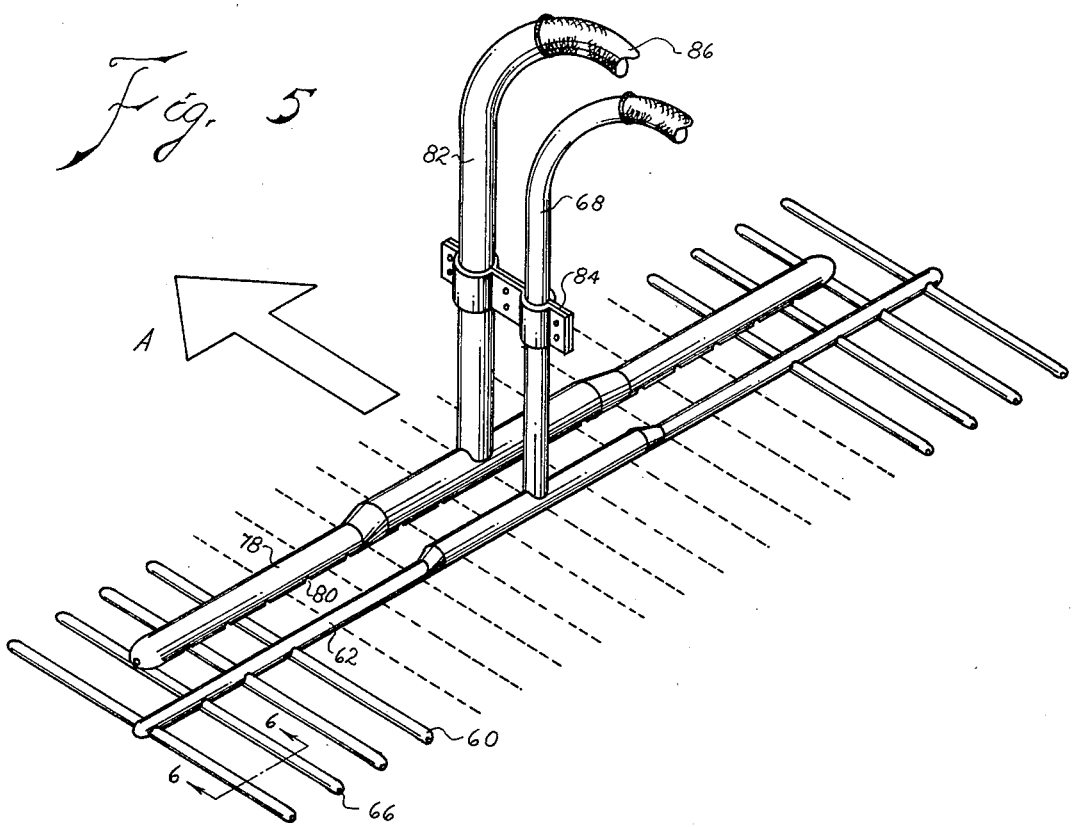
Fig. 5
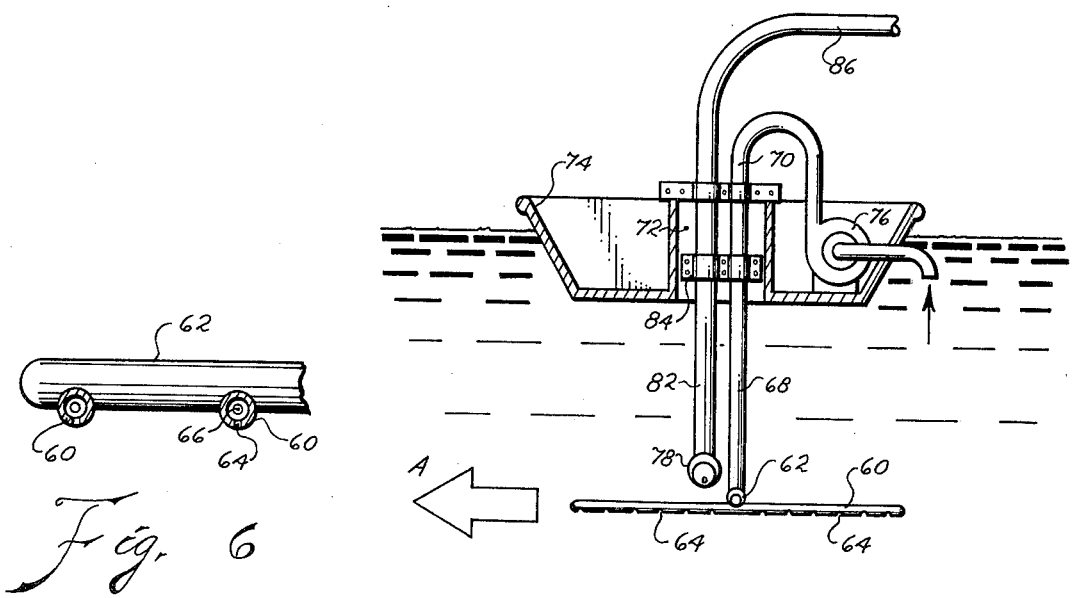
Fig. 6
Fig. 7

MINERAL LEACHING

BACKGROUND OF THE INVENTION (1) Field of the Invention

This invention relates to hydrometallurgy and more specifically to supplying, separating and assorting solids in liquid suspension by a vertical current.

(2) Description of the Prior Art

PACE, U.S. Pat. No. 3,863,002, states,

"Presently uranium ores are leached two ways: one is an agitated leach, the other is a static leach. In the case of the agitated leaching, large volumes of lixiviant are required to do the leaching and a liquid-solid separation step must be used before the uranium can be recovered from the lixiviant. The disadvantages of this system are the large volumes required for leaching, power cost for agitation, high equipment cost for solid-solution separation and excessive dilution of lixiviant after uranium dissolution resulting in a solution low in uranium concentration and low in acid content. If the lixiviant were not excessively diluted during the liquid-solid separation step, a large portion of the acid in this solution could be used again.

"In the case of present static leaching operations, two methods are used: one is to introduce the lixiviant to the top of a heap of raw ore and allow the lixivant to perculate through the ore, and the other is to introduce an acid solution with a low concentration of sulfuric acid on top of a heap of ore that has been previously mixed with a solution with a very high acid concentration. There are some problems with this type of leaching, the flow rate is usually extremely low, and there is a great possibility that all the acid will not make good contact with the lixiviant."

McKNIGHT, U.S. Pat. No. 3,224,581, discloses a process wherein ore is placed in the middle tank. Water is forced through a screen under the ore so the ore reaches a teeter condition and, therefore, is classified. LAUGHLIN, U.S. Pat. No. 2,420,180, shows a similar process and specifies that it is for iron ore.

Also at the time of filing this application, applicant was familiar with the following U.S. patents:

Ekstrom, U.S. Pat. No. 2,960,226
Meyer, U.S. Pat. No. 3,250,589
Mitterer, U.S. Pat. No. 3,777,003
Smith, U.S. Pat. No. 3,808,306
Robinson, U.S. Pat. No. 3,885,017
Kurata, U.S. Pat. No. 3,929,963

SUMMARY OF THE INVENTION (1) New and Different Function

I have invented a method and structure for leaching uranium compounds from ore which is quite advantageous. A large earthen tank capable of holding over 20,000 metric tons of ore is provided. This tank would be about 50 meters wide and about 66 meters long with a maximum depth of about seven meters. The tank would include a flat bottom of about 20 meters in width and about 36 meters in length. The depth to the flat bottom from the top would be about seven and one-half meters so it would readily have a liquid level over the bottom of about seven meters. From this bottom, each of the sides would slope upward to the edge of the tank. This tank shape is readily constructed by using standard excavation methods for earth tanks. The bottom and sloping sides of the tank are covered with an array of perforated pipes spaced about one meter apart. The ore is crushed in a single stage crusher and then all of the ore after crushing is made into a slurry and pumped into the tank. Sufficient ore is pumped into the tank to form an ore bed about 1.2 meters deep.

After this original ore bed is placed, it is classified by moving a sparge tube along the bottom of the tank and, therefore, also at the bottom of the original ore bed. The sparge tube discharges liquid at the teeter velocity of the ore, therefore, washing the fine particles of ore upward, leaving the heavier, coarser material at the bottom. Obviously, then, there will be a classification with the stratum of coarsely crushed ore at the bottom and finely crushed ore at the top with a gradient of coarse to fine therebetween.

After this first ore bed is established, a second ore bed is pumped in by slurry and it is classified and followed by a third ore bed, etc.

Thereafter, the leaching process begins. The ore is leached by the introduction of leaching liquid at a rate sufficiently low not to disturb the separate beds. It will be understood that in each bed at the bottom there will be an area of high permeability whereby the water can flow horizontally as well as upward. There will be a uniform flow upward through the fine material and there will not be a channelizing flow. After flowing through the first bed, the liquid will again redistribute itself to flow through the second and each subsequent bed. The lixiviant is drawn from the top and pumped to a recovery system from which the barren liquor is reconstituted to leach liquor and returned to the bottom of the tank to be used again as leach.

The leaching continues for 30 days, at the end of which time the ore in the tank is completely fluidized and pumped from the tank to a tailing pit, which is the disposal.

Analysis of my system will show that it has a very low capital investment to provide a large capacity. This is particularly significant when it will be understood that instead of having a single tank, four tanks are used. Therefore, one tank can be in the process of loading and unloading while the other three tanks are being leached. Likewise it will be understood that the water is always recovered from the tailing pit to be recirculated. The only water loss will be through evaporation, however, tank covers greatly reduce this loss.

Those skilled in the art will recognize that the system has inherent advantages including the following:

1. Decrease in sampling cost.
2. Elimination of fine ore storage surge capacity.
3. Decrease in crushing cost.
4. Complete elimination of leaching agitators.
5. Complete elimination of sand-slime separation equipment.
6. Complete elimination of thickners, settlers or liquid clarification.
7. Eighty percent reduction in capital cost.
8. Eighty-five percent reduction in labor cost.
9. Eighty percent reduction in water requirements.
10. Fifty percent reduction in heating requirements.

In addition to the above, recovery is only slightly less. According to my invention, 83% recovery of uranium is achieved as compared to an 88% recovery in a conventional carbonate leaching operation.

(2) Objects of the Invention

An object of this invention is to extract leachable minerals from ore.

Further objects are to achieve the above with a device that is sturdy, durable, simple, safe, efficient, versatile, and reliable, yet inexpensive and easy to manufacture, install, adjust, operate, and maintain.

Other objects are to achieve the above with a method that is versatile, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 5 is a perspective view of another embodiment showing a teeter array and an ore tube.

FIG. 6 is a sectional view taken substantially on line 6—6 of FIG. 5.

FIG. 7 is a side elevational view of the teeter array mounted on a barge, the barge shown in section.

DESCRIPTION OF THE PREFERRED EMBODIMENTS

As used herein, the term "leachable minerals" indicates any mineral which may be leached from its ore. "Leachable minerals" may be uranium, tin, copper, gold, silver, zinc, or many other minerals which can be recovered by hydrometallurgy processes. As a specific example, this application will discuss the leaching of mineral uranium which will normally be in the form of an oxide. In its extracted form, it will normally be uranyl tricarbonate.

The term "liquid" means any liquid which may be used for the slurring process, either to slurry the freshly crushed ore to be pumped into the tanks or to slurry the barren ore to be pumped to the tailing tank and will ordinarily be water.

In the trade, lixiviant is the liquor which is used to accomplish leaching; it places the leached mineral in a true solution.

"Pregnant liquor" is the input solution to recovery. While the liquor still has suspended solids, it is not called "pregnant liquor", and, when the minerals are recovered therefrom, it is not called "pregnant liquor". As a specific example, it will be a weak sodium carbonate-aqueous solution, containing uranyl tricarbonate but this invention is not meant to be so limited.

"Barren liquor" is used to mean the lixiviant after the minerals have been removed from it. After it has been reconstituted, i.e., the leaching additives have been replaced so that it is ready to leach with again, it is called "leach liquor".

Figure 2:
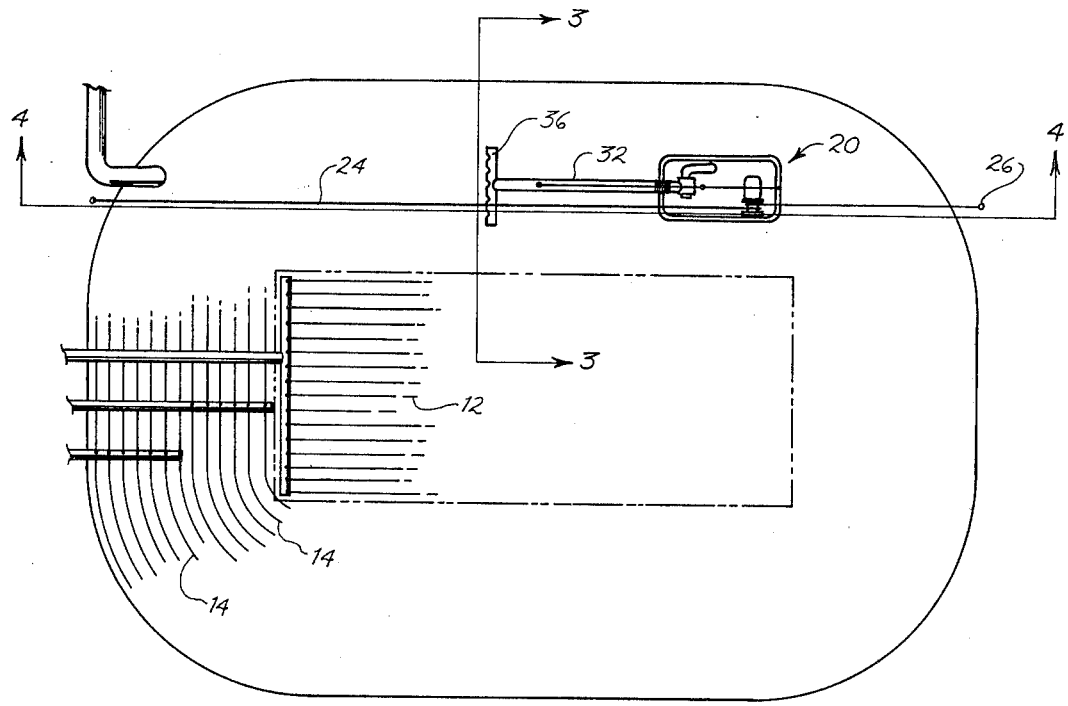
FIG. 2 is a top plan view of one leaching tank with the classification barge therein.
Figure 1:
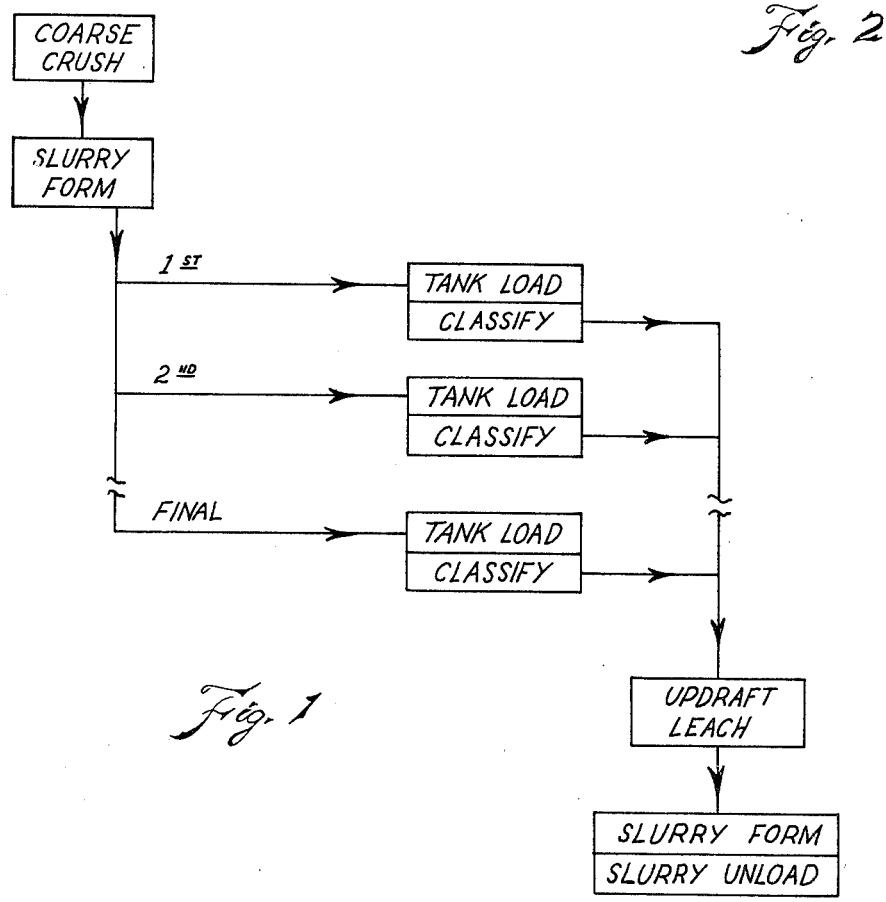
FIG. 1 is a schematic flow diagram as occurs in the practice of this invention.

Referring more particularly to the drawing, (FIGS. 2, 3 and 4) there may be seen earthen tanks having a capacity of 20,000 metric tons or more and having a total surface area of 3300 sq. meters. It is conventional in making earthen tanks to reduce liquid loss by covering the bottom of the tanks with polyethylene sheet or liner over a layer of sand fill 10. Thereafter, an array of pipes 12 is placed over the bottom of the tank. It is contemplated that the array would be made from manifolds and in the bottom the pipes would be spaced approximately on 60 cm centers and, further, they would have perforations or orifices every 30 cm. The array of pipes in the bottom would be strapped down at about two meters spacing along their length to keep them in proper position and to prevent floatation by the ore slurries during classification. Along the sloping sides there would be two or three separate manifolds having pipes 14 extending from them at 60 cm spacing with orifices every 30 cm therein, these manifolds being also strapped down to prevent floatation or change in spacing.

The tanks are provided with barges. (FIGS. 2, 3 and 4) These barges are connected by hoses (not shown) or the like to receive and distribute slurry from the ore crushing facilities. There would be the customary pipes and pumps to circulate the leaching liquid.

Those skilled in the art will understand that with four tanks, the barges may be lifted from one tank and transferred to another as they are needed and know how to provide the piping, pumping, barge lifting, etc.

Loading the tank with fresh slurry does not present special difficulty.

After the ore is loaded into the tank, the ore is classified. This is performed by barge 20 (FIGS. 2, 3 and 4) which has hull 22, making it adaptable to float upon the tank. Means are provided for moving the barge over the surface of the liquid in the tank. Since it is desired that the position of the barge be accurately controlled, I prefer to use cable 24 extending from suitable anchors 26 on rim 28 of the tank. The cable 24 extends around cathead 30 or the like located on or attached to the hull of the barge. Therefore, the rotation of the cathead causes the barge to advance along the cable. By moving the anchors 26 and by operation of the cathead 30, the exact position and movement of the barge can be controlled. It is desirable to have fair leads or guides on the hull 22 of the barge to orient the barge, however, these have not been shown for clarity of illustration. Likewise, the motors for the catheads have not been shown for clarity of illustration and because those with ordinary skill in the art will understand how to provide them.

Boom 32 extends from pump 34 on the hull of the barge to sparge tube 36. As seen, the sparge tube extends transversely from either side of the boom. Suction 38 of the pump 34 receives its liquid intake from the liquid within the tank itself. The boom 32 is pivoted at the pump 34 and the elevation or the depth of the sparge tube 36 is controlled by halyard 40 which is attached to the boom and extends over mast 42 to suitable windlass 44 attached to the hull.

As illustrated, the means for moving the barge also moves the sparge transversly thereto. I have had good success using a sparge tube of about three meters in length with a total flow of about 3000 liters per minute. Expressed otherwise, there will be a flow of about 1000 liters per minute per linear meter of the sparge tube. The perforations would be along the bottom and leading edges of the sparge tube so it would easily move through the ore bed. The exact degree of crushing or the fineness of the ore is not particularly critical as long as there are not too many extremely coarse particles. With the velocity produced by the sparge tube 36, the coarser particles will remain substantially at the bottom and will settle out more quickly than the finer particles so that after the sparge tube has been moved through the ore bed 50, the ore bed will be arranged with coarse particles in coarse stratum 52 on the bottom of the bed and the fine particles in fine stratum 54 at the top of the bed. I.e., each ore bed will be classified with a stratum of coarse particles at the bottom and a stratum of fine particles on top and, between the bottom and the top, the particles will progress from coarse to fine in the bed. From the above, it is believed that the operation is basically clear but for clarity it will be reviewed:

First the ore is crushed. I prefer to screen the crushed ore and return the larger particles to the crusher so they will not be placed in the tank. Thereafter, the ore is made into a slurry by conventional means and the slurry pumped into the tank, distributed over the tank to a depth of about 1.2 meters (4 feet) and then classified. To classify, the sparge tube 36 is passed, pumping liquid at teeter velocity, along the bottom of the bed 50, the coarse particles forming bottom stratum 52 and the fine particles forming top stratum 54. It will be understood that although the fine particles may not settle for a considerable period of time, all will settle. Thereafter, a second ore bed is placed in the tank, repeating the above steps; the steps being continued until there are a plurality of ore beds in the tank.

Figure 3:
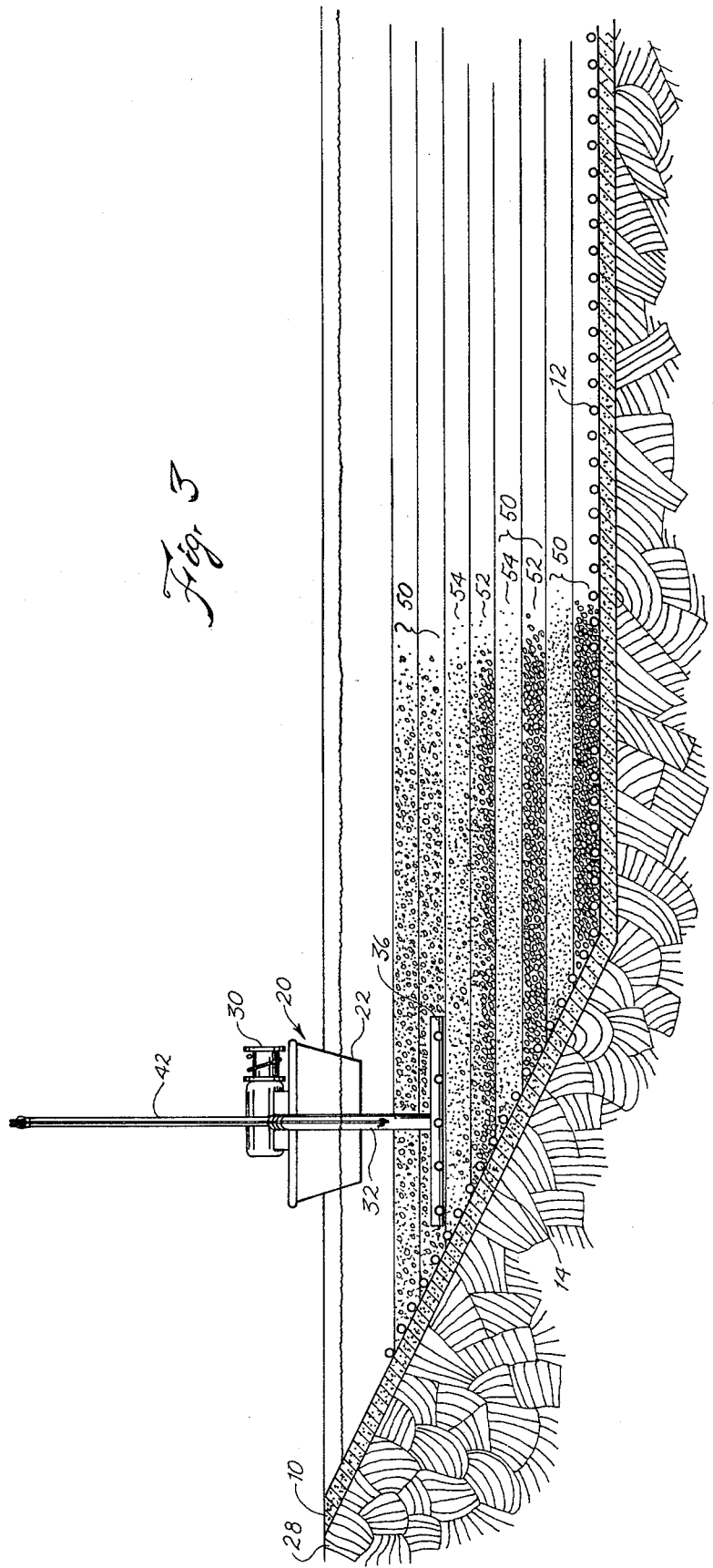
FIG. 3 is a sectional view taken substantially on line 3—3 of FIG. 2 showing a front view of said classification barge and a sectional view of the tank.
Figure 4:
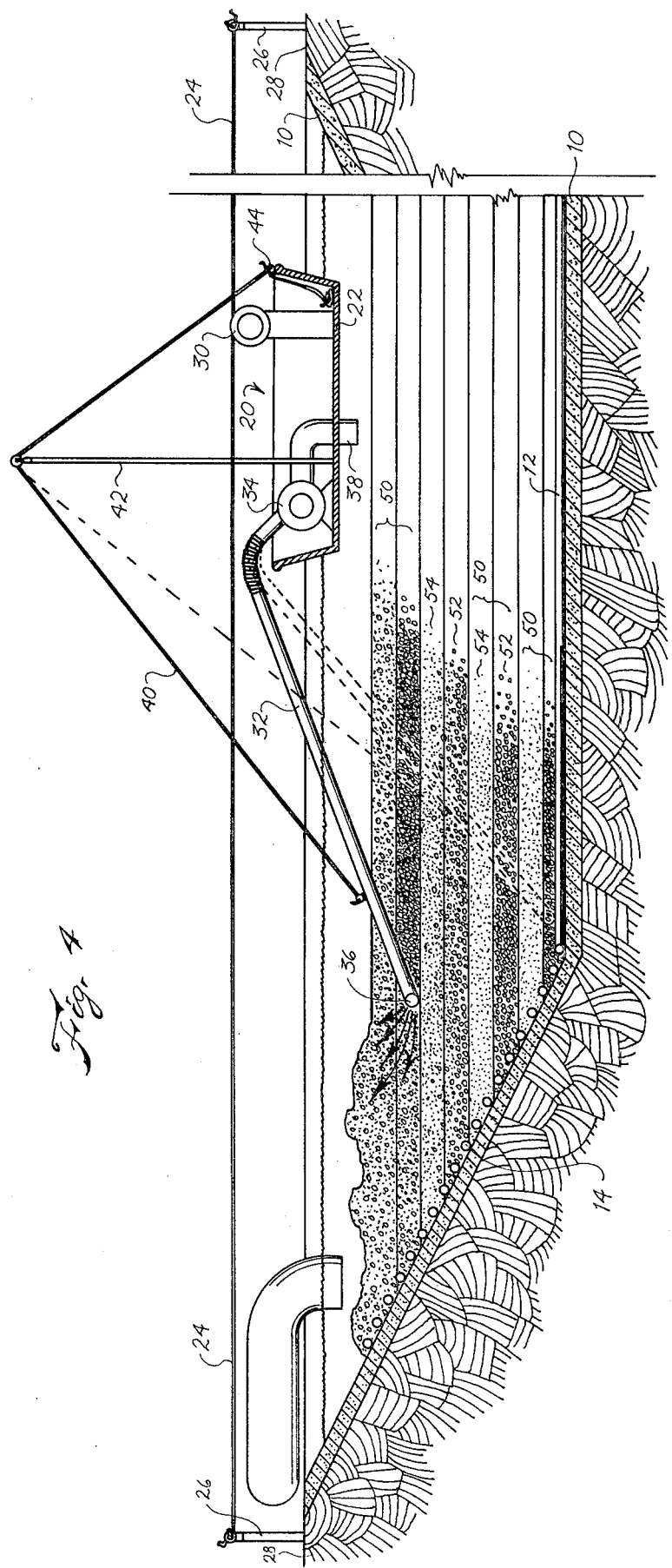
FIG. 4 is a sectional view taken substantially on line 4—4 of FIG. 2 showing a sectional view of the tank and classification barge.

As particularly seen in FIGS. 3 and 4 and previously stated, the sparge tube is at the bottom of the bed 50. Unless bed 50 is the first laid bed, the sparge tube when it is at the bottom of the bed 50 will be immediately above the previously prepared bed 50. I.e. in operation the sparge tube will always be immediately at the bottom of the uppermost bed 50.

Then, the leaching begins. The velocity of the leaching liquid is very low. In fact I have had good success using about 1000 liters per minute as the total flow rate over the entire tank, which, as stated before, has a total surface of about 3300 square meters so that the linear velocity is about 0.35 liters per minute per square meter. It will be understood that this will be quiescent conditions.

Some ores will contain certain bentonetic clays which will cause severe slime problems. By "slime" is meant that part of the ore which will pass a 200 mesh screen. With ores which have a high percentage of slime, it is necessary in the tanks to have special treatment for the slimes and they cannot remain as a quiescent layer on top of the other classified ores. It is a simple matter to keep them in suspension even though all other layers of ore are classified and placed in classified beds, but these slimes cannot be leached as a quiescent bed because of channeling.

The slimes can be handled in two basic manners: (1) they can be removed as a suspension or slurry from the tank containing the classified quiescent beds; or (2) they can remain in the same tank in a state of agitation sufficient to keep them in suspension. The agitation can be basically of different types, e.g., they can be fluidized above the quiescent beds by mechanically agitating or the velocity of the upward leaching fluid can be increased sufficiently so the slimes are agitated although the remainder of the bed is quiescent. This can be expressed: they would be placed in a full teeter condition by the upward flow. They could also be agitated by air injection, immediately above the quiescent beds.

After the ore in the tank is leached for a period of 30 days, the tank is emptied by fluidizing the ore beds, thus making a slurry of the ore beds and the slurry pumped to disposal, namely, to a tailing pit wherein the excess liquid is recovered and recycled.

FIGS. 5, 6, and 7, show a second embodiment for the barge and particularly the teeter equipment. It is the preferred form of the teeter equipment on the barge. Some difficulty has been experienced in moving the sparge tube of FIG. 4 transversely through the beds after the beds have been leached.

I use an array of sparge tubes comprising a plurality of small tubes 60 connected to header 62. Each of the small teeter tubes 60 has a plurality of fine holes 64 in the bottom. In addition, each teeter tube has fine end hole 66 in the end thereof. The end hole 66 aids the sparge tube teeter in moving through the bed of compacted ore particles. As indicated by arrow A, the array moves longitudinally of the sparge tubes 60.

The sparge tubes are separated by vertical boom 68 which is fluidly and structurally attached to the center of the header 62. It is noted that the header 62 is larger at the center, adjacent to the vertical boom 68, than toward the ends inasmuch as more liquid is carried near the center.

The vertical boom 68 is attached by clamp 70 within well 72 of barge 74. The vertical boom 68 is fluidly connected to the output of pump 76. The intake of the pump is from the liquid upon which the barge floats. The clamp 70 is a portion of elevation means for supporting the teeter array at a preset depth below the hull of the barge 74. Obviously, the pump 76 is a means connected to the teeter array for pumping liquid through all the sparge tubes. Propulsion means to move the hull of the barge longitudinally of the sparge tube is the same as the propulsion means shown in FIG. 4 and described above.

In the embodiment shown in FIGS. 5, 6, and 7, the ore is loaded into the tank while the teeter classification is progressing. Therefore, the ore is pumped in through ore tube 78 which has a plurality of ore holes 80 in the bottom thereof. The ore slurry is pumped from a source (not shown in FIGS. 6, 6 and 7) through ore boom 82. The ore boom is attached by clamp 84 to the vertical boom 68. It may be seen that clamp 84 forms adjustment means for supporting the ore tube a preset depth above the teeter array.

It may be seen that the ore boom 82 has flexible hose 86 attached thereto, which hose forms a portion of supply means connected to the ore tube for supplying crushed ore thereto. Analysis will show that it also forms means for taking barren slurry from the ore tube and disposing thereof. In such operation after the ore has been leached, the barren ore is made into a slurry by pumping liquid through the teeter array. The slurry is then sucked out by suction upon the hose 86.

It is believed that those with ordinary skill in the art would be able to construct the second embodiment of the barge from the description provided.

Typical dimensions are: The teeter holes are about 3 milimeters in diameter and 50 milimeters on center. The teeter tubes themselves are 25 milimeters in diameter, 75 milimeters on center and about 1.2 meters long, i.e., extending about 0.6 meters each side the header 62. The ore tube is approximately 40 centimeters above the teeter array and the ore holes are 25 milimeters in diameter and 75 milimeters on center. The ore tube is approximately 3.6 meters long. The teeter header would be approximately 4.3 meters long.

It will be understood by those skilled in the art that numerous changes can be made. Specific numbers given are examples of the best mode contemplated by me at this time for practicing the invention. Changes could include making the tanks deeper so they would accommodate more ore beds make each bed deeper up to about two meters. There could be four ore beds of two meters for a total of about eight meters in the tank with about one meter of liquid above the beds.

As an aid to correlating the terms of the claims to the exemplary drawing, the following catalog of elements is provided:

10 sand fill
12 pipes
14 pipes
20 barge
22 hull
24 cable
26 anchors
28 rim
30 cathead
32 boom
34 pump
36 sparge tube
38 suction
40 haylard
42 mast
44 windlass
50 bed
52 coarse stratum
54 fine stratum
60 small teeter tube
62 teeter header
64 teeter holes, bottom
66 teeter hole, end
68 vertical boom
70 clamp
72 well
74 barge
76 pump
78 ore tube
80 ore holes
82 ore boom
84 ore clamp
86 hose The embodiments shown and described are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. The method of extracting leachable minerals from ore comprising:
   (a) crushing the ore, then
   (b) forming a fresh slurry with the crushed ore and a liquid, then
   (c) pumping the crushed ore into an ore tank having liquid, and
   (d) forming a bed of crushed ore below the liquid, then
   (e) classifying the ore bed into strata, with a stratum of course ore below of at least one stratum of fine ore, then
   (f) leaching the classified ore bed in a quiescent condition by circulating liquid
      (i) from the bottom of the tank,
      (ii) up through the ore bed,
      (iii) into a stratum above the ore bed,
      (iv) through a recovery system, and
      (v) back to the bottom of the tank.

2. The invention as defined in claim 1 wherein the step of classifying is by
   (j) pumping liquid at the bottom of an unclassified stratum bed at velocities proper
   (k) to teeter the unclassified portions of the bed.

3. The invention as defined in claim 2 wherein the step of teetering is by a barge floating on the liquid in the tank.

4. The invention as defined in claim 2 wherein the step of teetering is by
   (m) moving a horizontal sparge tube at the bottom of the ore bed while
   (n) pumping the liquid as defined above from the sparge tube.

5. The invention as defined in claim 1 wherein the stratum of coarse ore has greater permeability than the stratum of fine ore above it.

6. The invention as defined in claim 1 with additional limitations of
   (j) pumping additional fresh slurry of crushed ore into the tank after classifying the previous ore bed, then
   (m) classifying the additional ore bed as the previous ore bed.

7. The invention as defined in claim 1 with an additional limitation of
   (j) forming a plurality of classified ore beds in the tank.

8. The invention as defined in claim 7 wherein the leaching liquid moves horizontally as well as upward through each coarse stratum and upward through each fine stratum.

9. The invention as defined in claim 7 wherein the additional classified ore beds are formed by
   (k) pumping additional fresh slurry of crushed ore into the tank after classifying the previous ore bed, then
   (n) classifying the additional ore bed as the previous ore bed.

10. The invention as defined in claim 9 wherein the step of classifying is by
    (o) pumping liquid at the bottom of the unclassified bed at velocities proper
    (p) to teeter the bed.

11. The invention as defined in claim 10 wherein the step of teetering is by
    (q) moving a horizontal sparge tube at the bottom of the ore bed while
    (r) pumping the liquid as defined above from the sparge tube.

12. The invention as defined by claim 11 wherein the step of teetering is by a barge floating on the liquid in the tank.

13. The invention as defined by claim 12 wherein each stratum of coarse ore has greater permeability than the stratum of fine ore above it.

14. The invention as defined in claim 13 wherein the leaching liquid moves horizontally as well as upward through each coarse stratum and upward through each fine stratum.

15. The invention as defined in claim 14 wherein the step of pumping said fresh slurry into the tank is by a barge floating on liquid in the tank.

16. The invention as defined in claim 15 further comprising:
   (s) forming a barren slurry from the leached ore bed, and
   (t) pumping the barren slurry to disposal by use of a barge.

17. The method of extracting leachable minerals from ore comprising:
   (a) crushing the ore, then
   (b) forming an ore bed in a large open earthen tank with sufficient liquid, thus
   (c) forming a liquid stratum in the tank over the ore bed,
   (d) classifying the ore bed into strata with a stratum of coarse ore below at least one stratum of the fine ore, thereafter
   (e) leaching the classified ore bed in a quiescent condition by circulating liquid
      (i) from the bottom of the tank,
      (ii) up through the ore bed,
      (iii) into a stratum above the ore bed,
      (iv) through a recovery system, and
      (v) back to the bottom of the tank.

18. The invention as defined in claim 17 wherein the step of classifying is by
   (f) pumping liquid at the bottom of the unclassified bed at velocities proper
   (g) to teeter the bed.

19. The invention as defined in claim 18 wherein the step of teetering is by a barge floating on the liquid in the tank.

20. The invention as defined in claim 18 wherein the step of teetering is by
   (h) moving a horizontal sparge tube at the bottom of the ore bed while
   (j) pumping the liquid as defined above from the sparge tube.

21. The invention as defined in claim 17 wherein the stratum of coarse ore has greater permeability than the stratum of fine ore above it.

22. The invention as defined in claim 17 with additional limitations of
   (f) adding fresh crushed ore into the tank after classifying the previous ore bed, then
   (h) classifying the additional ore bed as the previous ore bed.

23. The invention as defined in claim 17 with an additional limitation of
   (f) forming a plurality of classified ore beds in the tank.

24. The invention as defined in claim 23 wherein the leaching liquid moves horizontally as well as upward through each coarse stratum and upward through each fine stratum.

25. The method of extracting leachable minerals from ore comprising:
   (a) crushing the ore, then
   (b) forming a fresh slurry with the crushed ore and a liquid,
   (c) floating a barge on liquid in a large earthen ore tank,
   (d) pumping the fresh slurry of crushed ore into the large earthern ore tank through said barge, then
   (e) forming a bed of crushed ore below the liquid, thereafter
   (f) leaching the ore bed by circulating liquid
      (i) from the bottom of the tank,
      (ii) up through the ore bed,
      (iii) into a stratum above the ore bed,
      (iv) through a recovery system, and
      (v) back to the bottom of the tank, thereafter
   (g) forming a barren from the leached ore bed, and finally
   (h) pumping the barren slurry through the barge floating on the liquid in the large earthen ore tank to disposal.

* * * * *